Aug. 22, 1967     L. F. OTIS ET AL     3,337,047

TRAY FOR CLEANING CONTACT LENSES

Filed Aug. 20, 1964

INVENTORS.
LOUIS F. OTIS
and HENRY G. DALEY

BY *Joseph Zallen*

ATTORNEY.

United States Patent Office 3,337,047
Patented Aug. 22, 1967

3,337,047
TRAY FOR CLEANING CONTACT LENSES
Louis F. Otis, 701 Gay St., Westwood, Mass. 02090, and Henry G. Daley, 79 Commercial St., Lynn, Mass. 01905
Filed Aug. 20, 1964, Ser. No. 390,833
5 Claims. (Cl. 206—72)

This invention relates to a tray-like support for materials used in cleaning of contact lenses. In particular, it relates to an inexpensive and easy to clean support for holding such materials in useful proximity.

Users of contact lenses wear their lenses only for the length of time that the physician or optometrist prescribes. Accordingly, the contact lenses must be removed from the eyes and placed in a safe, clean area pending further use. Also, insertion of contact lenses is a task requiring great care and involving proper preparation of the lens, such as proper cleaning and wetting prior to insertion. Further, since many contact lenses are made of plastic, which has a typically soft surface, the user must also use extreme diligence in avoiding scratching. In addition, contact lenses being small, thin, and light-weight can be easily damaged. It is thus necessary to have at the ready disposal of the user a number of various accessories in order to properly insert contact lenses and remove them to a safe place.

One object of this invention is to provide a support for holding in useful proximity the various materials used in the insertion or removal of contact lenses.

A further object of this invention is to provide such a support which would aid a relatively untrained person in the insertion or removal of contact lenses.

Figure 1:
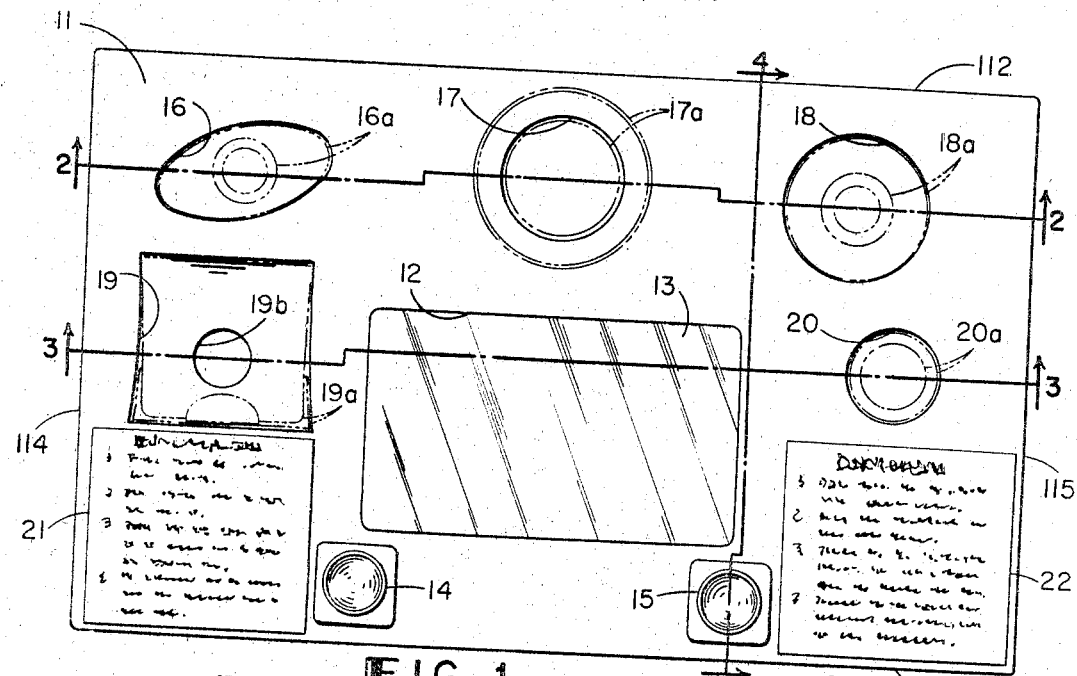

Further objects and advantages and disadvantages will be apparent from the specification and claims which follow and from the appended drawings wherein:

FIG. 1 is a plan view of an embodiment of this invention, showing various objects in phantom position on the novel support of this invention.

Figure 2:
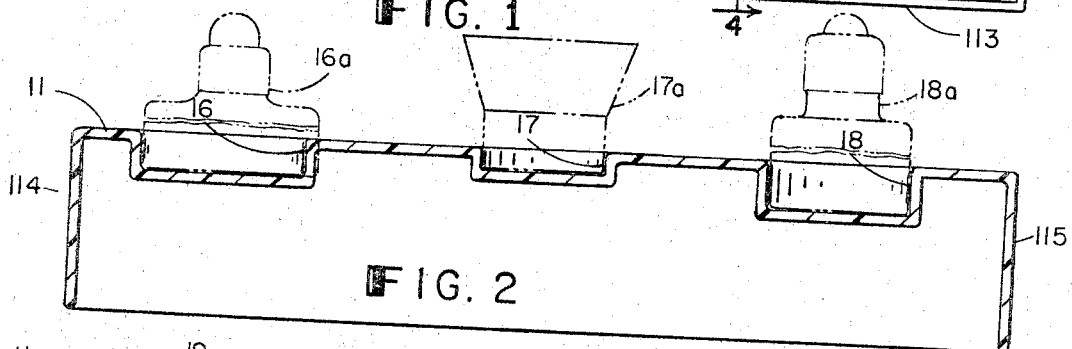
Figure 3:
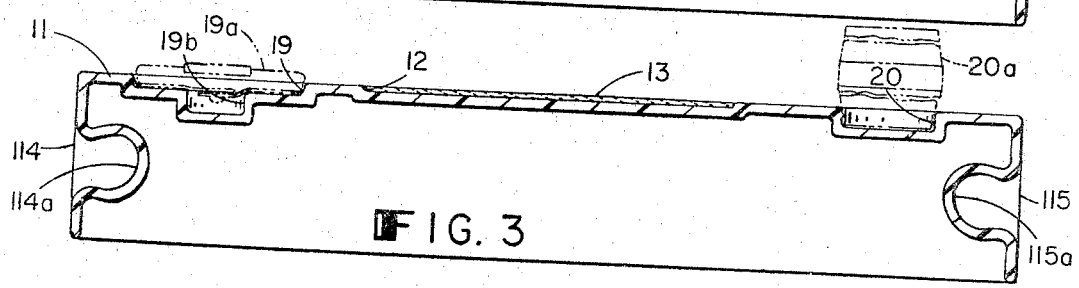
Figure 4:
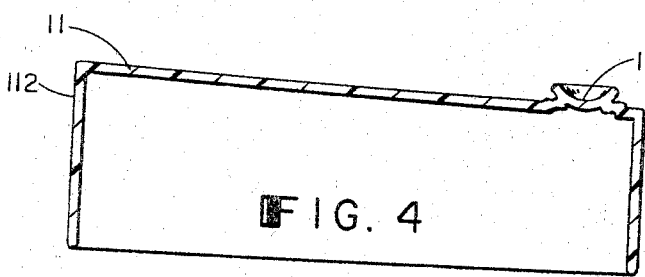

FIG. 2 is a section along line 2—2 of FIG. 1.
FIG. 3 is a section along line 3—3 of FIG. 1.
FIG. 4 is a section along line 4—4 of FIG. 1.

The invention in its general sense comprises an integral plastic body formed preferably from a sheet so as to have a top portion, depending sidewalls, and a plurality of cavities for accommodating the containers used in the process of insertion or removal of contact lenses. The invention is further characterized by having a cavity in which a mirror is affixed and the care of cavities shaped to hold the two contact lenses. It is preferred that the top portion have a gentle forward slope so that the mirror is at a slight angle. It is preferred that the lens cavities be formed in front of the mirror with the cavities for washing and cleaning aids to be arranged to the rear of the mirror. The storage or soaking chambers are preferably inserted on either side of the mirror. It is also preferred that on the left and right hand side of the top there be affixed directions to serve as a reminder to the user of the necessary steps to preserve the cleanliness and integrity of the contact lenses.

Referring now to the drawings, there is illustrated therein an integral plastic shell having a top portion 11, a depending rear wall 112, and depending front wall 113, and depending sidewalls 114 and 115. Finger depressions 114a and 115a are provided for handling of the shell. The top portion 11 has a slight forward taper from the rear wall 112 to the front wall 113.

The top portion 11 of the shell has a plurality of cavities, namely a line of rear cavities 16, 17, and 18 for accommodating a bottle 16a, a cup 17a, or a bottle 18a. Such bottles could hold soaking and wetting solutions. In a somewhat central position is a cavity 12 in which is mounted a mirror 13, which can either be flat or have some curvature to give magnification. On either side of the mirror are cavities, namely 19 and 20 for use with dry and wet storage containers 19a and 20a. Directly below each of these latter cavities are various warnings as to the length of time lenses should be worn, the necessity for washing hands before handling lenses, the importance of cleaning lenses as directed before and after wear, the importance of washing lens storage cases, and the over all criticality of meticulous cleanliness in use of contact lenses.

Forward of the mirror 13 are two projections having cavities, namely 14 and 15, to hold the contact lenses in a stable position. These cavities are preferably elevated, although suitable depressions may be used. It is also preferable to have the lens cavities of different colors so that the user may distinguish the one for the left eye from the one for the right eye.

The support of this invention provides an easy to clean means for holding the necessary objects and materials in a proper spatial arrangement so as to greatly facilitate the proper and safe insertion and removal of contact lenses.

While a preferred embodiment of this invention has been described in detail, it will be understood that the invention is not to be limited to the particular construction set forth, since various changes in the form, proportion, arrangement of parts, and details of construction may be resorted to without departing from the spirit and scope of this invention or destroying any of the advantages contained in the same, heretofore described and defined in the following claims.

We claim:

1. A tray for holding in useful proximity materials and objects used in the handling of contact lenses, said tray comprising: an integral plastic body having a top portion and depending sidewalls; said top portion having a plurality of open top closed bottom cavities formed therein with the side walls of said cavities depending therefrom, said cavities being adapted to hold two liquid containers and a cup, and one of said cavities having a mirror affixed therein and a pair of said cavities being shaped to hold contact lenses and being spaced forward of said mirror.

2. The support of claim 1 wherein indicia are provided on the top surface to provide suitable advice for the user.

3. The support of claim 1 wherein said top portion has a gentle forward slope.

4. The support of claim 1 wherein the mirror is substantially centrally located and the cavities for the containers and cup are spaced rearward of the mirror.

5. The support of claim 1 wherein on either side of the mirror are cavities adapted to hold lens storage containers.

References Cited

UNITED STATES PATENTS

| | | | |
|---|---|---|---|
| 1,912,215 | 5/1933 | Odom | 206—38 X |
| 2,625,242 | 1/1953 | Reed | 220—23.8 X |
| 2,821,307 | 1/1958 | Linsley | 206—72 X |
| 2,851,154 | 9/1958 | Dingeldein | 206—72 X |
| 2,932,383 | 4/1960 | Fagan | 206—5 |
| 3,013,656 | 12/1961 | Murphy. | |
| 3,089,500 | 5/1963 | Stalcup | 206—5 X |
| 3,095,084 | 6/1963 | White | 229—87.2 X |
| 3,115,146 | 12/1963 | Erwin | 206—5 X |

LOUIS G. MANCENE, *Primary Examiner.*